L. R. EVANS.
GASOLENE TANK FOR MOTOR CYCLES.
APPLICATION FILED AUG. 26, 1916.
1,226,199.
Patented May 15, 1917.
2 SHEETS—SHEET 2.
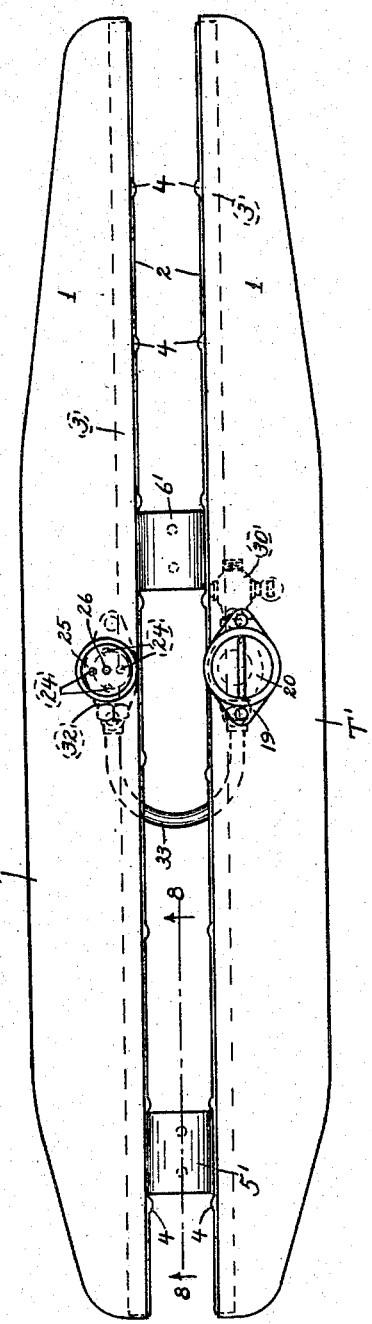
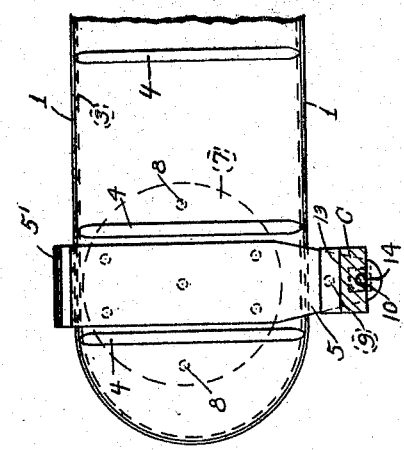
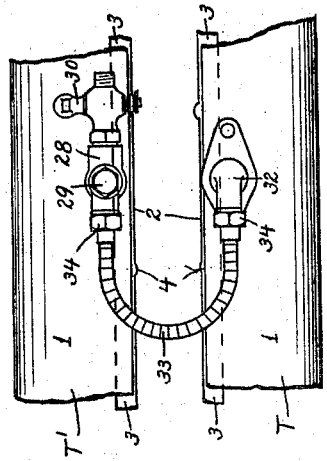
INVENTOR
Leigh R. Evans
BY
Lyman E. Dodge
ATTORNEY

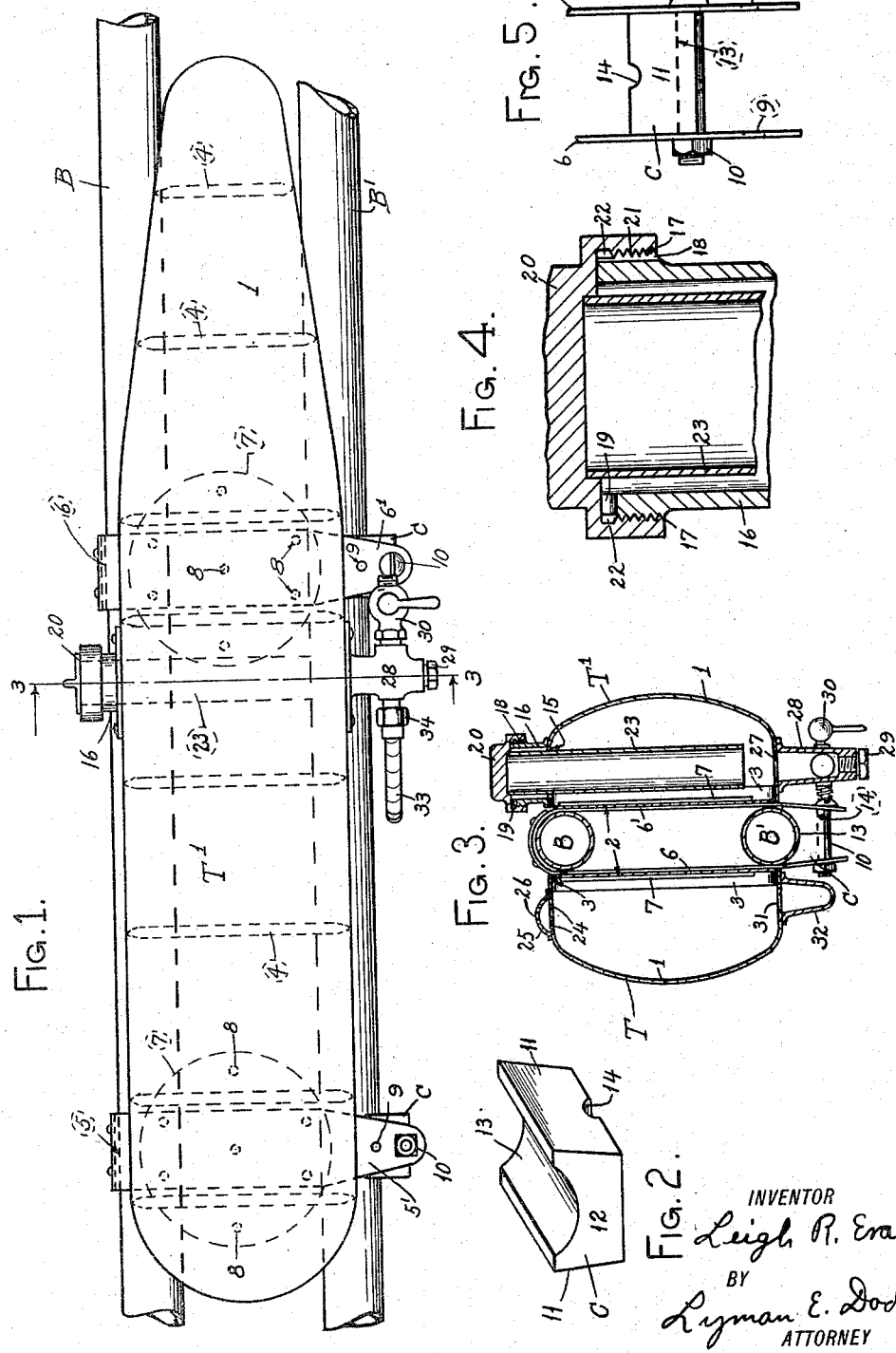

UNITED STATES PATENT OFFICE.

LEIGH R. EVANS, OF ROCHESTER, NEW YORK.

GASOLENE-TANK FOR MOTOR-CYCLES.

1,226,199.

Specification of Letters Patent.

Patented May 15, 1917.

Application filed August 26, 1916. Serial No. 117,073.

*To all whom it may concern:*

Be it known that I, LEIGH R. EVANS, a citizen of the United States, and a resident of the city of Rochester, in the county of Monroe and State of New York, have invented a new and useful Gasolene-Tank for Motor-Cycles, of which the following is a specification.

This invention relates to receptacles or tanks, and more particularly to tanks which are attached to the frames of bicycles and motorcycles and which are used for holding gasolene or oil.

In certain well known types of frames for bicycles and motorcycles the upper part of the frame is formed by two bars which generally extend horizontally and are parallel for all or part of their length; and the primary object of this invention is to devise a strong and yet light tank which can be easily and quickly attached to these two bars of the frames of bicycles and motorcycles of this type.

Other objects and advantages will appear hereinafter as the description of the invention progresses and the novel features of the invention will be pointed out in the appended claims.

The invention consists in the parts, and in the combinations and arrangements of parts which are more fully described hereinafter.

In the accompanying drawing, in which is illustrated the preferred physical embodiment of the invention and in which like reference characters refer to like parts in the several views, Figure 1 is a side view of a gasolene tank embodying the invention and also shows the tank applied to the two bars of a bicycle frame;

Fig. 2 is a perspective view of a clamping block constituting part of the construction;

Fig. 3 is a vertical transverse section of the tank taken substantially on the line 3—3 in Fig. 1 and looking in the direction of the arrows;

Fig. 4 is a fragmentary vertical section through the upper part of the filling tube and cap and shows the construction of the parts whereby a vent opening for admitting air to one section of the tank is provided;

Fig. 5 is a fragmentary view of the lower part of one pair of the clamping strips and shows the position of the clamping block when the tank is assembled for shipment;

Fig. 6 is a top plan view of the complete tank;

Fig. 7 is a fragmentary view of a portion of the bottom of the tank near its middle and shows the curved pipe connecting the two sections of the tank; and Fig. 8 is a fragmentary vertical section taken substantially on the line 8—8 in Fig. 6, looking in the direction of the arrows.

Referring to the accompanying drawing, the bicycle or motorcycle frame of the type above mentioned is familiar to those skilled in the art and to avoid unnecessary illustration, the entire frame is not shown; but to enable a clear understanding of the nature of this invention and to show clearly the mode of attachment of the tank to bicycle or motorcycle frames of this type, parts of the two upper bars are shown as they are usually found in such frames and are designated B and B'. The tank as a whole consists in effect of two similar or counterpart halves or sections T and T' alike in construction which are connected together and are secured to the bars B and B' in the manner explained hereinafter. Each of the sections T and T' comprises two members 1 and 2 which are stamped or pressed from plates of sheet metal of the desired thickness, one of these members 1 forming the top, bottom and one of the sides of a section, and the other member 2 forming the other side of that section. Referring to Figs. 1 and 6, the preferable shape of the sections T and T' can be readily seen, both ends of these sections being rounded so as to increase the strength, and the rear, or right hand end of each section as viewed in Figs. 1 and 6, being tapered in width (see Fig. 6) so as to obtain the desired clearance, and also in depth (see Fig. 1) to permit the attachment of the tank to frames in which the bars B and B' are not parallel as shown but converge toward each other at the rear of the frame. It should be understood that the particular shape illustrated, while I consider it to be best adapted for the special purpose to which I apply the tank, may be varied as desired. The member 2 is a flat plate of the proper shape to fit into the open side of the member 1 and is formed with a flange 3 all around its edge which is fitted inside of the edge of the member 1 and is welded, soldered or otherwise suitably fastened to said member 1 so as to form a liquid tight joint therewith. At intervals throughout the length of the member 2 vertical strengthening ribs or bosses 4 are pressed in the metal.

The tank is designed to be attached to the horizontal bars B and B', and for this purpose two pairs of clamping strips 5—5', 6—6' are fastened to the members 2 of the sections T and T', one pair near the front end of the tank, the other pair a short distance back of the middle, a circular reinforcing plate 7 being fastened to the inside face of each member 2 opposite each of these clamping strips. These clamping strips and the reinforcing plates 7 are preferably fastened to the members 2 by the well known method of spot welding, as indicated by the small circles designated 8, although riveting or any other suitable manner of fastening may be employed. The upper ends of the clamping strips 5—5', 6—6' of each pair are curved and overlapped and then fastened together, as by spot welding, indicated by the small dotted circles (see Fig. 3); and when the tank is attached to the bicycle frame, these upper curved ends rest on the upper bar B, as shown in Figs. 1 and 3. The lower end portions of the clamping strips 5—5', 6—6' project a short distance below the bottom of the sections T and T' and are provided with pairs of alined holes 9 adapted to receive the clamping bolts 10, there being any number of holes 9 in said clamping strips as may be necessary to obtain the desired range of adjustment of the clamping bolts 10.

Between the projecting lower end portions of each pair of clamping strips 5—5', 6—6' is disposed a clamping block C, shown separately in Fig. 2, which has two sides faces 11 lying in converging planes and two end faces 12 lying in parallel planes. In the top face of the clamping block C, as it is viewed in Fig. 2, is a comparatively wide concave groove 13 shaped to conform to the curvature of the bar B'; and in the under face of the block C is a narrower concave groove 14 shaped to receive a clamping bolt 10, the grooves 13 and 14 being cut at right angles to each other. When the tank is assembled for shipment, the clamping block C is positioned between the lower end portions of a pair of clamping strips 5—5' or 6—6' as shown in Fig. 5, with the parallel end faces 12 of said block contacting with the inside faces of said end portions, and with the wider groove 13 down and resting on the clamping bolt 10. With the block C in this position shown in Fig. 5, the corresponding pair of clamping strips may be drawn tightly together by tightening the bolt 10 so as to hold the sections T and T' of the tank rigidly together, without, however, bending or distorting said end portions of the clamping strips. On the other hand, when the tank is attached to the bicycye or motorcycle frame, a clamping block C is positioned between the lower end portions of a pair of clamping strips 5—5', or 6—6' in the position shown in Figs. 1, 3 and 8, so that the converging side faces 11 of said block are in contact with said end portions, the wider groove 13 being opposite the lower bar B' and the narrower groove 14 being opposite the clamping bolt 10. When the clamping bolts 10 are tightened and the lower end portions of the clamping strips 5—5' and 6—6' are drawn together, the clamping blocks C are wedged upward against the lower bar B', and this action in turn causes the whole tank to move down until the upper curved ends of said clamping strips press tightly against the upper bar B, thereby firmly holding the tank on said two bars B and B'. This clamping takes place by reason of tension in members 5—5' and 6—6' and not by reason of the bending thereof so that a strong clamping action may be obtained with comparatively light members 5—5' and 6—6' and at the same time a strain is not put on the inside members 2 of the tank body proper tending to bend them inward.

In one of the sections of the tank, this section being designated T' in the drawing, is a filling hole 15, around which is riveted and soldered, or otherwise suitably fastened, the edges of a filling tube 16, which has external screw-threads 17 cut in it for part of its length near its upper end. In these screw-threads 17 is cut a vertical groove 18 (see Fig. 4) which is preferably V-shaped in cross section and is slightly deeper than the depth of the threads 17; and at some distance from the groove 18, preferably diametrically opposite thereto, a shallow notch 19 is cut in the upper edge of said filling tube, as shown in Fig. 4. The filling tube 16 is provided with a cap 20 which has a downwardly projecting flange formed with internal screw threads 21, as best shown in Fig. 4, there being an annular groove or recess 22 around the inside of said flange above the threads 21. To the under face of the filling cap 20 is soldered or otherwise suitably fastened the end of a measuring tube 23, which, when the cap 20 is in place, extends down into the section T' of the tank, as shown in Fig. 3.

The construction just described affords a vent passage for air to enter the section T' of a form which has been found by actual trial to avoid any objectionable oozing or leaking of the gasolene through this vent passage. Referring more particularly to Fig. 4, it can be seen that when the cap 20 is in place, the screw-threads 21 thereon extend partway across the groove 18 and in effect act as baffle plates to impede any sudden expulsion of air or gasolene through the groove 18. The air to replace the gasolene as it is drawn from the tank can, however, easily pass along the groove 18 to the annular groove 22, then in either direction along this groove to the notch 19, and then through this notch into the space between the inside of the filling tube 16 and the outside of the measuring tube 23 down into the tank. The size of the groove 18, together with the baffle plate action of the screw threads 21 and the number of abrupt changes in direction in this vent passage, make it practically impossible for sudden spurts of gasolene to find their way along this passage.

Since the tank sections T and T' are separate, it is necessary to provide a vent for air to enter the section T, and such a passage is afforded by small holes 24, four being shown, in the top of the section T (see Fig. 3) which is covered by a convex disk 25 having a small central hole 26. The space between the top of the section T and the disk 25 forms a chamber or pocket which receives any of the gasolene that may be forced through the hole 24 in the top of the section T, so that this gasolene will flow back through the same hole 24 into the tank after the pressure which forces it out through that hole is removed, thereby avoiding the leakage of gasolene through the hole 26 in the disk 25.

The tank is specially intended to be used with engines of the type which can be lubricated in whole or in part by oil mixed with the gasolene; and to facilitate the mixing of the lubricating oil with the gasolene in the right proportions, the measuring tube 23 is provided, so that when the cap 20 is removed and inverted, this tube 23 may be used to measure the lubricating oil and may be filled a certain number of times for each tankful of gasolene, as desired.

In the bottom of the section T' is a discharge hole 27 which communicates with a bore or chamber in a sediment cup 28 which has a removable plug 29 in its lower end for cleaning purposes. A cut-off valve or cock 30 is screwed into the sediment cup 28 a short distance from the bottom and is connected to the usual gasolene supply pipe (not shown) leading to the carbureter. In the bottom of the section T is a hole 31 which communicates with a chamber or bore in a fitting 32 which is riveted and soldered to the bottom of said section; and connecting the sediment cup 28 and the fitting 32 is a curved pipe 33 preferably of copper or similar material so that this pipe may be bent comparatively easily, the connection between the ends of this pipe 33 and the sediment cup 28 and the fitting 32 being by means of unions 34 of ordinary construction. The pipe 33 connects the two sections T and T' of the tank so that these sections will empty equally; and the pipe 33 being easily bent without injury, does not interfere with the movement of the sections of the tank toward each other as may be necessary to obtain a tight clamping of the sections on the bars B and B' of the bicycle frame as explained hereinbefore.

In assembling the parts of the tank, the filling tube 16 and the sediment cup 28 are riveted and soldered to the member 1 of the section T' before the member 2 of this section is connected to said member 1, and since free access is had to both faces of the top and bottom of the member 1, the rivets or other fastening means used may be better applied. In the same way, the fitting 32 is fastened to the member 1 of the section T before the member 2 of this section is assembled. After the members 2 are shaped and the flange 3 and the ribs 4 formed, the reinforcing plates 7 and the clamping strips 5—5' and 6—6' are welded to said members 2; and then the members 1 and 2 of each section are assembled together and the joints soldered or otherwise made liquid tight. The two sections are then placed together with the upper curved end portions of the clamping strips 5—5' and 6—6' overlapped and spot welded, the clamping blocks C are placed between the lower ends of said clamping strips in the position shown in Fig. 5, and the bolts 10 inserted and tightened, whereupon the tank is ready for shipment. When attaching the tank to the bars B and B' of a bicycle frame, the bolts 10 and the blocks C are removed and the tank is slipped down over the bars, then the blocks C are replaced between the lower ends of the clamping strips but changed in position as shown in Fig. 3, and the bolts 10 inserted and tightened. The wedging action of the blocks C, together with the drawing together of the clamping strips serves to fix the tank firmly to the bars B and B' of the bicycle frame; and it is apparent that the construction of the attaching means is such that the tank can be firmly attached to bicycle frames in which there is some variation in the spacing and arrangement of the bars B and B'.

The strength of the tank is increased by rounding all edges and corners, by the ribs 4 pressed in the members 2 of each section, the reinforcing plates 7, and by the clamping strips 5—5', and 6—6', the whole structure forming a container of great strength compared with its weight and one which is well adapted for use as a gasolene tank for vehicles and for other purposes where such tanks are subjected to severe stresses and vibrations. Other advantages of the construction embodying the invention will be apparent to those skilled in the art without further explanation.

Obviously various changes may be made in the particular construction shown and described without departing from my invention, and I do not wish to be restricted to the details of the construction shown and described.

What I claim is:

1. A gasolene tank comprising two counterpart sections spaced apart, pairs of strips fastened to said sections and having their upper end portions fastened together in overlapping relation, the lower end portions of said strips projecting below the bottom of said sections, a block disposed between the lower projecting end portions of each pair of strips and having side faces disposed in converging planes in contact with said end portions, and means for drawing the lower projecting end portions of said pairs of strips toward each other.

2. A gasolene tank comprising two counterpart sections spaced apart, pairs of strips connected to said sections and having their upper end portions fastened together, the lower end portions of said strips projecting below the bottom of said sections, a removable block disposed between said lower end portions of each pair of strips and having side faces disposed in converging planes and in contact with said end portions of said strips, said block having a concave groove in its upper face, the end faces of said block being parallel and spaced apart a distance substantially equal to the space between said sections, whereby said block may be placed between the end portions of each pair of strips in position to hold said end portions parallel, and clamping bolts passing through the lower end portions of each pair of strips.

3. A gasolene tank comprising two counterpart sections spaced apart, pairs of strips fastened to said sections and connecting said sections along their upper edges, the lower end portions of said strips being extended below the bottom edges of said sections, a removable block disposed between the lower end portions of each pair of strips, the side faces of said block being disposed in converging planes and the end faces of said block being parallel, whereby said block may be placed between the lower end portions of each pair of strips in position to maintain said end portions parallel or to permit said end portions to converge together downward, and clamping bolts passing through the lower end portions of each pair of strips below the corresponding block and serving to draw said end portions together.

4. A gasolene tank comprising two counterpart sections spaced apart, pairs of strips fastened to said sections and having their upper end portions fastened together in overlapping relation, the lower end portions of said strips projecting below the lower edges of said sections, a curved bendable pipe connected at its ends to the bottoms of said sections, and means for drawing the lower projecting end portions of said strips together.

5. A gasolene tank comprising two counterpart sections spaced apart, each section being formed of two members of sheet metal fastened together, one of said members forming the top, bottom and one side of a section, the other member forming the other side of the corresponding section, a curved bendable pipe connected at its ends to the bottom of said sections, and means for connecting said sections together.

LEIGH R. EVANS.

Copies of this patent may be obtained for five cents each, by addressing the "Commissioner of Patents, Washington, D. C."